US009143273B2

(12) United States Patent
Sugihara et al.

(10) Patent No.: US 9,143,273 B2
(45) Date of Patent: Sep. 22, 2015

(54) MULTI-LEVEL DIFFERENTIAL DECODING DEVICE AND METHOD FOR QUADRATURE AMPLITUDE MODULATION COMMUNICATION SYSTEM

(71) Applicant: Mitsubishi Electric Corporation, Chiyoda-ku (JP)

(72) Inventors: Takashi Sugihara, Chiyoda-ku (JP); Hiroshi Nishimoto, Chiyoda-ku (JP); Tsuyoshi Yoshida, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/408,090

(22) PCT Filed: Nov. 18, 2013

(86) PCT No.: PCT/JP2013/081010
§ 371 (c)(1),
(2) Date: Dec. 15, 2014

(87) PCT Pub. No.: WO2014/091879
PCT Pub. Date: Jun. 19, 2014

(65) Prior Publication Data
US 2015/0139350 A1 May 21, 2015

(30) Foreign Application Priority Data

Dec. 14, 2012 (JP) .................................. 2012-273538

(51) Int. Cl.
*H03D 1/00* (2006.01)
*H04L 27/06* (2006.01)
(Continued)

(52) U.S. Cl.
CPC ............ *H04L 1/0047* (2013.01); *H04L 1/0054* (2013.01); *H04L 27/34* (2013.01); *H04L 2025/03363* (2013.01)

(58) Field of Classification Search
CPC .................. H04L 1/0047; H04L 27/34; H04L 2025/03363; H04L 1/005; H04L 1/0051; H04L 1/0054; H04L 1/0055
USPC ......... 375/264, 262, 261, 280, 331, 341, 340, 375/332; 714/794, 795
See application file for complete search history.

(56) References Cited

U.S. PATENT DOCUMENTS 5,920,599 A * 7/1999 Igarashi ......................... 375/341
6,226,333 B1 * 5/2001 Spalink ......................... 375/340
(Continued)

FOREIGN PATENT DOCUMENTS

JP  6-177928   6/1994
JP  8-274747   10/1996
(Continued)

OTHER PUBLICATIONS

International Search Report issued Dec. 10, 2013, in PCT/JP13/081010 filed Nov. 18, 2013.
(Continued)

*Primary Examiner* — Phuong Phu
(74) *Attorney, Agent, or Firm* — Oblon, McClelland, Maier & Neustadt, L.L.P.

(57) ABSTRACT

Differential decoding processing applied to multilevel modulation is accomplished with the circuit scale kept small by including; an MSB coordinate rotating part for performing coordinate rotation based on information of the first two most significant bits of a signal received via a synchronous detection part; an MSB symbol likelihood generating part for generating likelihood with respect to the first two most significant bits after differential decoding, with the use of two sets of bit strings at different points in time for which coordinate rotation has been performed; an LSB symbol likelihood generating part for generating likelihood with respect to less significant bits; and a soft decision error correction decoding part for generating a decoded signal with the use of the likelihood of the first two most significant bits and the likelihood of the less significant bits.

8 Claims, 5 Drawing Sheets

(51) Int. Cl.
*H04L 1/00* (2006.01)
*H04L 27/34* (2006.01)
*H04L 25/03* (2006.01)

(56) References Cited

U.S. PATENT DOCUMENTS

| | | | |
|---|---|---|---|
| 7,224,753 B2* | 5/2007 | Yui | 375/341 |
| 8,645,806 B2 | 2/2014 | Sugihara et al. | |
| 8,724,744 B2* | 5/2014 | Gurney et al. | 375/332 |
| 2004/0114692 A1 | 6/2004 | Matsumoto | |
| 2012/0294346 A1* | 11/2012 | Kolze | 375/224 |
| 2013/0205184 A1 | 8/2013 | Nishimoto et al. | |

FOREIGN PATENT DOCUMENTS

| | | |
|---|---|---|
| JP | 8-288967 | 11/1996 |
| JP | 2001-268147 | 9/2001 |
| JP | 2004-194079 | 7/2004 |
| JP | 2004-260712 | 9/2004 |
| JP | 3822982 | 9/2006 |
| WO | WO 2005/109811 A1 | 11/2005 |
| WO | WO 2008/001456 A1 | 1/2008 |
| WO | WO 2012/070369 A1 | 5/2012 |

OTHER PUBLICATIONS

Abe, et al., "A Soft Decision Decoding Method in the Differential Phase Shift Keying", The Transactions of the Institute of Electrical Engineers of Japan C IEEJ Transactions on Electronics, Information and Systems, vol. 111, No. 11, 1991, pp. 563-568.

Yoshida, et al., "Digital Signal Processing for Equalization of Fiber Nonlinearity in Coherent Receivers", 2012 17th Opto-Electronics and Communications Conference (OECC 2012) Technical Digest, 5B1-3, Jul. 2012, pp. 443-444.

Gao, et al., Cycle-slip resilient carrier phase estimation for polarization multiplexed 16-QAM systems, 2012 17th Opto-Electronics and Communications Conference (OECC 2012) Technical Digest, 4B2-4, Jul. 2012, pp. 154-155.

* cited by examiner

FIG. 2

| 1011 | 1001 | 0010 | 0011 |
|  ○   |  ○   |  ○   |  ○   |
| 1010 | 1000 | 0000 | 0001 |
|  ○   |  ○   |  ○   |  ○   |
| 1101 | 1100 | 0100 | 0110 |
|  ○   |  ○   |  ○   |  ○   |
| 1111 | 1110 | 0101 | 0111 |
|  ○   |  ○   |  ○   |  ○   |

MULTI-LEVEL DIFFERENTIAL DECODING DEVICE AND METHOD FOR QUADRATURE AMPLITUDE MODULATION COMMUNICATION SYSTEM

TECHNICAL FIELD

The present invention relates to a multilevel differential decoding device and method for a QAM modulation communication system which uses QAM modulation, and more particularly, to a novel technology for accomplishing processing of decoding a multilevel-modulated optical signal that has been encoded differentially with the circuit scale kept small.

BACKGROUND ART

In recent years, multilevel modulation is being applied more and more for the purpose of improving the frequency utilization efficiency in addition to giving an optical communication system a large capacity. However, it is a known fact that raising the multilevel degree in order to increase the transmission capacity decreases phase noise tolerance proportionately (see, for example, Non Patent Literature 1).

A technology of inserting a pilot signal has been proposed in order to guarantee transmission performance to deal with phase slipping due to phase noise that is caused by multilevel modulation transmission (see, for example, Non Patent Literature 2).

Inserting a pilot signal, however, increases the degree of redundancy depending on the frequency of pilot insertion, and the accompanying rise in the operating speed of an electric circuit leads to a problem of difficulty in dealing with high transmission rate.

As another known technology to deal with the phase slipping, there is known to use differential encoding. This technology gives tolerance for changes in absolute phase by providing information about a transition between consecutive signal points on a phase space of two I/Q signals that are orthogonal to each other. This does not require the insertion of an additional signal, which means that there is no accompanying rise in signal operating speed, and therefore has an advantage of excellent suitability for high-speed signal transmission.

In a known technology related to multilevel-signal demodulation processing, a more significant bit of a received signal is used to determine a quadrant of the signal's coordinates, whereas likelihood generating processing is performed with respect to a less significant bit of the received signal independently of the more significant bit (see, for example, Patent Literature 1).

There is also known a technology of receiving a modulated signal that has been encoded differentially and generating likelihood with respect to the received signal (see, for example, Patent Literature 2, Patent Literature 3, and Patent Literature 4).

In still another known technology, likelihood generating processing is performed separately with respect to a more significant bit and less significant bit of a received quadrature amplitude modulation (QAM) signal vector (see, for example, Patent Literature 5, Patent Literature 6, and Patent literature 7).

In a known technology for a method of differentially encoding two bits on the most significant bit (MSB) side which are associated with quadrant identification, and encoding bits on the least significant bit (LSB) side by Gray encoding, decoding processing combined with symbol rotation is performed on the LSB-side bits (see, for example, Patent Literature 8).

A digital coherent transmission technology that uses digital signal processing is drawing attention as a technology for accomplishing a transmission rate of 100 Gbps or higher.

With this technology, amplitude information obtained with the use of an analog-to-digital converter (ADC) can be applied to the processing of a received signal, which makes it easy to employ, in combination, an error correction technology that uses soft decision, and improves reception performance.

CITATION LIST

Patent Literature

[PTL 1] JP 08-288967 A
[PTL 2] JP 08-274747 A
[PTL 3] JP 06-177928 A
[PTL 4] JP 2001-268147 A
[PTL 5] WO 2005/109811 A1
[PTL 6] JP 2004-260712 A
[PTL 7] WO 2008/001456 A1
[PTL 8] JP 3822982 B2

Non Patent Literature

[NPL 1] T. Yoshida, et al., "Digital signal processing for equalization of fiber nonlinearity in coherent receivers" OECC2012, 5B1-3, 2012.
[NPL 2] Y. Gao, et al., "Cycle-slip resilient carrier phase estimation for polarization multiplexed 16-QAM systems" OECC201 2, 4B2-4, 2012.

SUMMARY OF INVENTION

Technical Problem

A problem of related-art multilevel differential decoding devices and methods for a QAM modulation communication system is that, although individual technologies such as the multilevel modulation technology that uses the digital coherent technology, the error correction technology, and the technology of generating likelihood in QAM modulation have been proposed for the purpose of accomplishing optical communication in which the multilevel degree is enhanced, the decrease in phase noise tolerance due to multilevel modulation cannot be solved effectively by error correction.

Specifically, there is a problem in that no circuit configuration has been proposed for the case where, in an attempt to accomplish high-speed transmission of a multilevel-modulated signal, a differential encoding/decoding technology is applied to QAM modulation and is combined with error correction in order to prevent the circuit operating speed from rising while avoiding the influence of phase slipping.

The present invention has been made to solve the problem described above, and it is an object of the present invention to attain a multilevel differential decoding device and method for a QAM modulation communication system that are capable of accomplishing differential decoding processing applied to multilevel modulation with the circuit scale kept small.

Solution to Problem

According to one embodiment of the present invention, there is provided a multilevel differential decoding device for a QAM modulation communication system, including: a synchronous detection part for receiving a signal in which differential encoding has been performed on first two most significant bits of an N-bit transmission symbol, where N≥4 holds; an MSB coordinate rotating part for performing coordinate rotation based on information of the first two most significant bits out of a reception symbol of the signal received via the synchronous detection part; an MSB symbol likelihood generating part for generating likelihood with respect to the first two most significant bits after differential decoding, with use of two sets of bit strings at different points in time for which coordinate rotation has been performed based on the first two most significant bits; an LSB symbol likelihood generating part for generating likelihood with respect to less significant bits out of the reception symbol of the received signal that are (N−2) bits on a least significant side; and a soft decision error correction decoding part for generating a decoded signal by performing error correction decoding processing with use of the likelihood of the first two most significant bits which has been generated by the MSB symbol likelihood generating part and the likelihood of the less significant bits which has been generated by the LSB symbol likelihood generating part.

Advantageous Effects of Invention

According to one embodiment of the present invention, the differential decoding circuit can have a simple configuration, without needing to increase the multilevel degree, by performing the differential decoding processing after the coordinate rotating processing, based on the information of the first two most significant bits, which indicates quadrant information.

BRIEF DESCRIPTION OF DRAWINGS

FIG. 2 is an explanatory diagram illustrating an example of the arrangement of multilevel signal points that are used in the first embodiment of the present invention.

DESCRIPTION OF EMBODIMENT

First Embodiment

A first embodiment of the present invention is described below with reference to the drawings.

Figure 1:
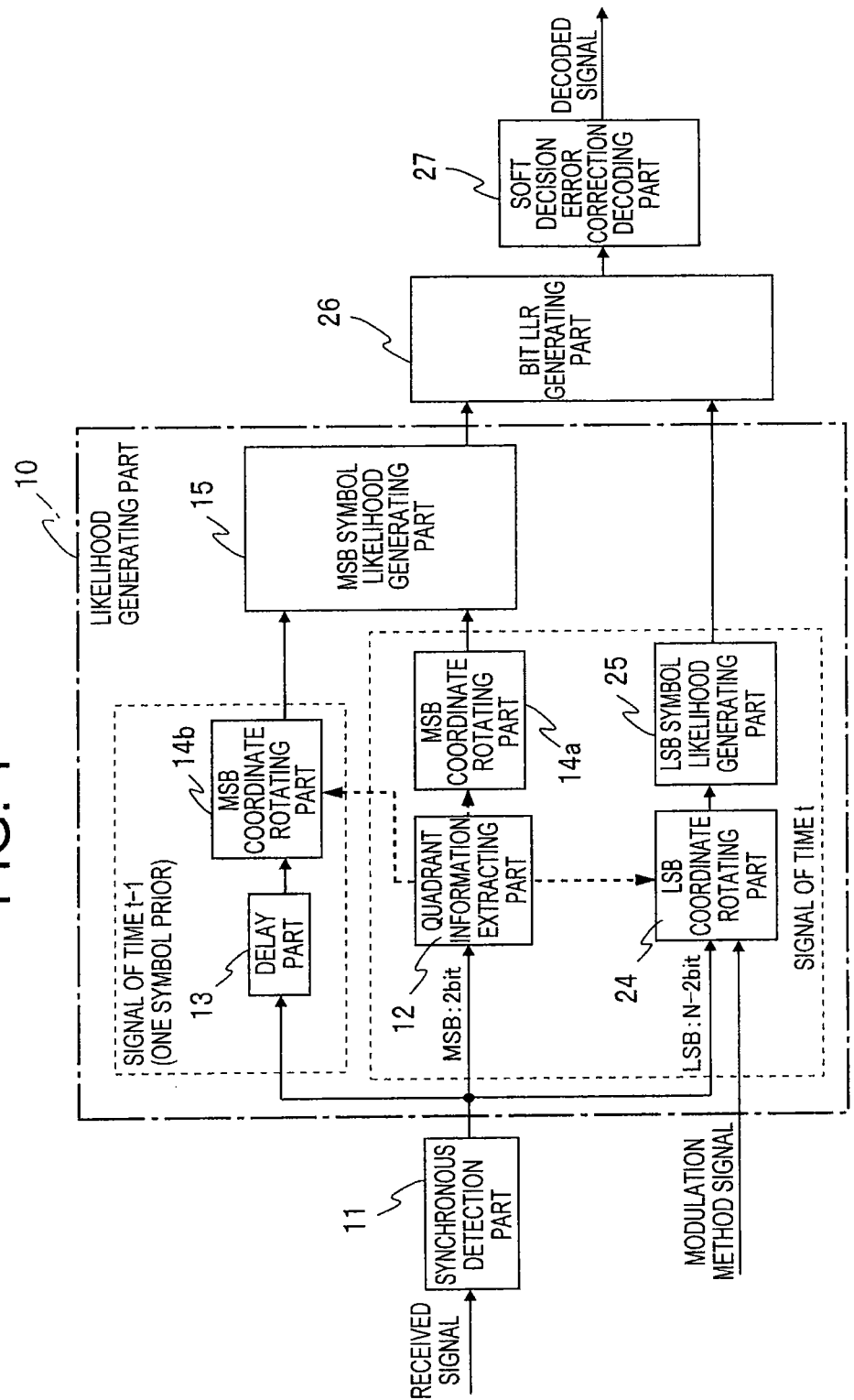
FIG. 1 is a function block diagram illustrating a multilevel differential decoding device for a QAM modulation communication system according to a first embodiment of the present invention.

FIG. 1 is a function block diagram illustrating a multilevel differential decoding device for a QAM modulation communication system according to the first embodiment of the present invention, and illustrates the configuration of a receiver.

In FIG. 1, the multilevel differential decoding device for a QAM modulation communication system includes a likelihood generating part 10, a synchronous detection part 11 for inputting a signal received from a transmitter to the likelihood generating part 10, a bit logarithm-of-likelihood-ratio (LLR) generating part 26, and a soft decision error correction decoding part 27.

The likelihood generating part 10 includes a quadrant information extracting part 12, a delay part 13, MSB coordinate rotating parts 14a and 14b, an MSB symbol likelihood generating part 15, an LSB coordinate rotating part 24, and an LSB symbol likelihood generating part 25.

Two broken-line frames in the likelihood generating part 10 respectively represent the application range of a signal of a time t−1 (one symbol prior) and the application range of a signal of a time t (current symbol).

Broken-line arrows from the quadrant information extracting part 12 represent coordinate rotation information, which varies depending on the quadrant of the signal of the time t.

The quadrant information extracting part 12 uses MSB-side bits (two bits) out of a signal received at the time t to extract information of a quadrant where the received signal is present, and inputs the extracted quadrant information to the MSB coordinate rotating parts 14a and 14b and the LSB coordinate rotating part 24.

The MSB coordinate rotating part 14a performs coordinate rotation on the received signal based on the quadrant information, and inputs the resultant received signal to the MSB symbol likelihood generating part 15.

The delay part 13 delays the received signal and inputs a signal received at the time t−1 (one symbol prior) to the MSB coordinate rotating part 14b. The MSB coordinate rotating part 14b performs coordinate rotation on the signal one symbol prior based on the quadrant information, and inputs the resultant received signal to the MSB symbol likelihood generating part 15.

The MSB symbol likelihood generating part 15 uses the two input signals in MSB differential decoding, thereby generating MSB symbol likelihood, and inputs the MSB symbol likelihood to the bit LLR generating part 26.

The LSB coordinate rotating part 24, on the other hand, uses the quadrant information and a modulation method signal as input information, performs coordinate rotation on LSB-side bits ((N−2) bits on the least significant side) out of the received signal, and inputs the resultant received signal to the LSB symbol likelihood generating part 25. The symbol likelihood generating part 25 generates LSB symbol likelihood from the signal input from the LSB coordinate rotating part 24, and inputs the LSB symbol likelihood to the bit LLR generating part 26.

The bit LLR generating part 26 uses signals input from the MSB symbol likelihood generating part 15 and the LSB symbol likelihood generating part 25 to generate a bit LLR, and the soft decision error correction decoding part 27 generates a decoded signal which is decoded with the use of the bit LLR.

A more concrete description is given below with reference to FIGS. 2 to 4 on the operation of the first embodiment of the present invention which is illustrated in FIG. 1.

FIG. 2 is an explanatory diagram illustrating an example of the arrangement of multilevel signal points that are used in the first embodiment of the present invention, and illustrates a case where each signal point has four bits (N=4).

Figure 3:
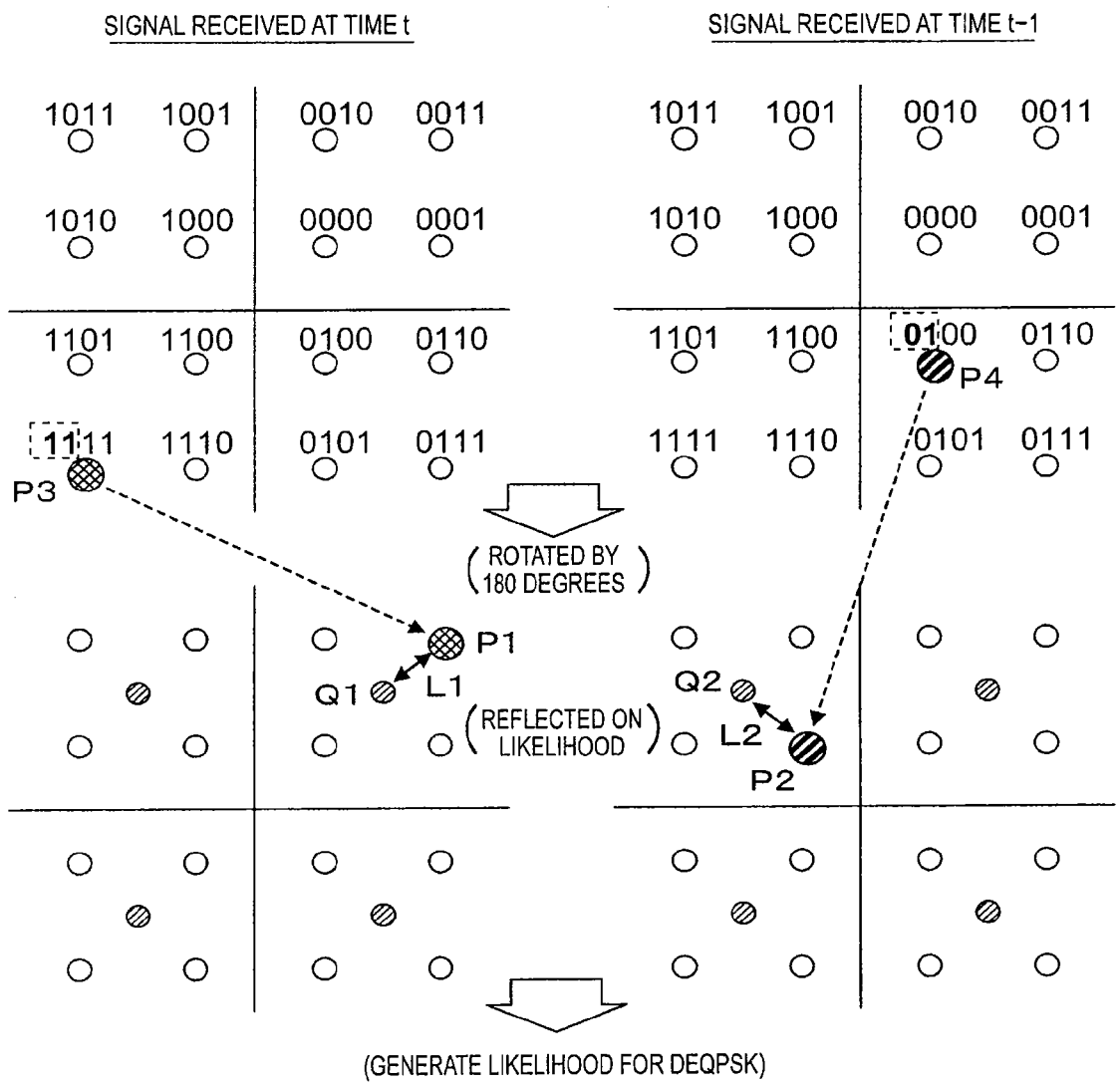
FIG. 3 is an explanatory diagram illustrating an example of generating the likelihood of MSB-side bits according to the first embodiment of the present invention.

FIG. 3 is an explanatory diagram illustrating an example of generating the likelihood of MSB-side bits (MSB symbols) according to the first embodiment of the present invention.

Figure 4:
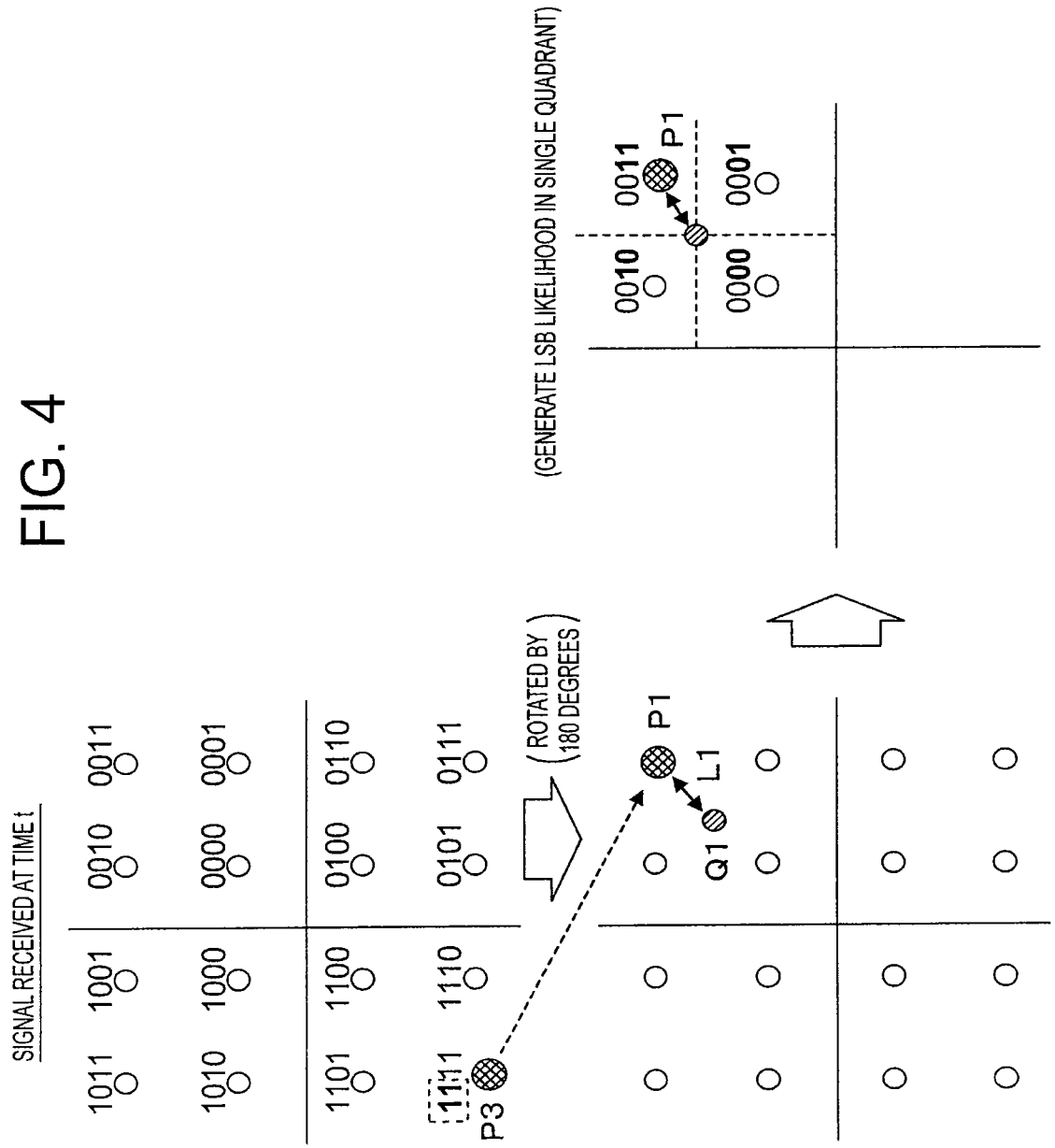
FIG. 4 is an explanatory diagram illustrating an example of generating the likelihood of an LSB-side bit according to the first embodiment of the present invention.

FIG. 4 is an explanatory diagram illustrating an example of generating the likelihood of an LSB-side bit (LSB symbol) according to the first embodiment of the present invention.

In FIGS. 2 to 4, two MSB-side bits "00, 10, 11, and 01" (see bits within the broken-line frames) in the respective signal points indicate pieces of information associated with the respective quadrants.

The description given here takes as an example processing of demodulating a 16-QAM-modulated signal (4-level modulation) in which two MSB-side bits for identifying the quadrant are encoded differentially.

In the case of signals mapped as illustrated in FIG. 2, for example, each reception symbol is demodulated by the synchronous detection part 11 as a complex signal having a certain signal bit width.

Though not shown, the synchronous detection part 11 can carry out processing of reproducing a received optical field, distortion equalizing processing, and the like with the use of normal digital coherent light receiving processing, and compensation for waveform distortion, demultiplexing of a polarization-multiplexed signal, and the like are carried out by digital signal processing as well.

First, the quadrant information extracting part 12 uses two MSB-side bits out of a signal received at the time t, which represents a point in time, to extract information of a quadrant where the received signal is present.

To demodulate, the MSB coordinate rotating part 14a performs coordinate rotation based on the quadrant information and rearranges the received signal in a single quadrant. Similarly, the MSB coordinate rotating part 14b performs the same coordinate rotation associated with the quadrant information of the signal received at the time t on a signal received at the time t−1 (one symbol prior).

FIG. 3 illustrates a case in which a signal point P3 in the third quadrant "11" at the time t is rotated by 180 degrees to be redisposed as a signal point P1 in the first quadrant "00", and a signal point P4 in the fourth quadrant "01" at the time t−1 is rotated by 180 degrees to be redisposed as a signal point P2 in the second quadrant "10".

The rotation operation described above is for arranging a reference point for likelihood generation in a single quadrant (the first quadrant) alone and, when a signal point of a signal received at the time t is located in the second quadrant, for example, the signal point is rotated by 90 degrees to be redisposed in the first quadrant. A signal point of a signal received at the time t−1 is also rotated by 90 degrees in this case.

The MSB symbol likelihood generating part 15 thus generates likelihood for differential encoded quadrature phase shift keying (DEQPSK), with a single quadrant (the first quadrant) alone as the reference.

In generating the likelihood, the MSB symbol likelihood generating part 15 obtains likelihood values based on Euclid distances L1 and L2 from hypothetically highest likelihood points Q1 and Q2 (see hatched circles) respectively for the signal point P1 at the time t and the signal point P2 at the time t−1. The MSB symbol likelihood generating part 15 generates post-differential decoding likelihood from the likelihood values and transition states of the two points P1 and P2, thereby generating likelihood with respect to the first two bits on the MSB side.

The post-differential decoding likelihood generating processing which uses two bits can be carried out with the use of a known DEQPSK demodulation technology.

Demodulation of two bits on the LSB side, on the other hand, makes use of a feature of the signal point arrangement in which Gray encoding involving a 90-degree rotation for each quadrant is performed.

Specifically, as illustrated in FIG. 4, the LSB coordinate rotating part 24 performs coordinate rotation based on extracted quadrant information "11" on the signal point P3 at the time t, to thereby redispose the signal point P3 as the signal point P1 in the first quadrant "00" (single quadrant).

Next, the LSB symbol likelihood generating part 25 determines the LSB-side likelihood directly (without executing differential decoding processing) based on the Euclid distance L1 from the hypothetically highest likelihood point Q1.

Subsequently, from the pieces of likelihood information generated by the MSB symbol likelihood generating part 15 and the LSB symbol likelihood generating part 25 (MSB symbol likelihood and LSB symbol likelihood), the bit LLR generating part 26 generates bit likelihood (a bit LLR) which corresponds to the code word of an error correction code, and inputs the bit LLR to the soft decision error correction decoding part 27.

Lastly, the soft decision error correction decoding part 27 executes error correction decoding processing with the use of the bit LLR, thereby generating a decoded signal.

For more accurate decoding processing in the soft decision error correction decoding part 27, the unit of the code word of an error correction code is desirably known in advance. In this case, information about the position of a frame that constitutes the error correction code is necessary, and the peripheral configuration of a soft decision error correction decoding part 27A therefore needs to be changed as illustrated in FIG. 5 (which is described later).

Applying the decoding processing described above to a differentially encoded signal is also effective for the prevention of loss of frame position information in the event of phase slipping. In this case, an error correction code and a frame that have tolerance to phase slipping can be configured by allocating, for example, a bit string at the head of a frame that constitutes an error correction code (a frame alignment signal) to two MSB-side bits on the transmitter side and then executing differential encoding processing.

Figure 5:
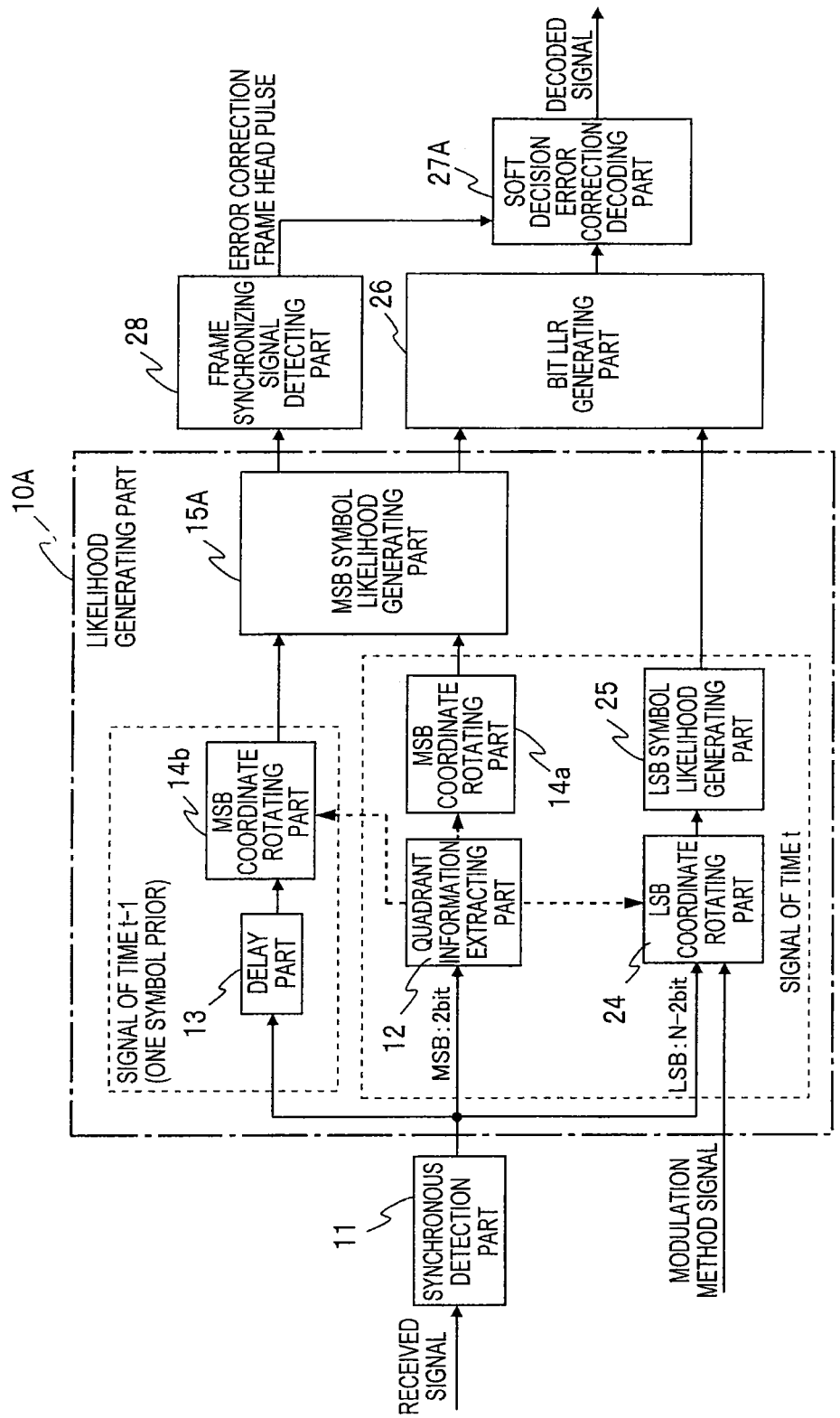
FIG. 5 is a function block diagram illustrating another configuration example of the multilevel differential decoding device for a QAM modulation communication system according to the first embodiment of the present invention.

FIG. 5 is a function block diagram illustrating another configuration example of the multilevel differential decoding device for a QAM modulation communication system according to the first embodiment of the present invention. Components in FIG. 5 that are similar to those described above (see FIG. 1) are denoted by the same reference symbols that are used above, or by the same reference symbols with a suffix "A" added at the end, in order to omit detailed descriptions thereof.

In FIG. 5, a frame synchronizing signal detecting part 28 for generating a frame head pulse of an error correction code (error correction frame head pulse) is inserted between an MSB symbol likelihood generating part 15A inside a likelihood generating part 10A and the soft decision error correction decoding part 27A.

The MSB symbol likelihood generating part 15A in this case generates a post-differential decoding frame head bit based on a frame head bit string that is included in a received signal, and inputs the generated frame head bit to the frame synchronizing signal detecting part 28.

As illustrated in FIG. 5, the frame synchronizing signal detecting part 28 is provided downstream of MSB-side decoding processing, which is executed by the MSB symbol likelihood generating part 15A, and supplies the position of a frame that constitutes an error correction code (for example, a pulse that indicates the frame head) to the soft decision error correction decoding part 27A, thereby accomplishing error correction decoding processing that has solid tolerance to phase slipping.

While the frame synchronizing signal detecting part 28 is inserted between the likelihood generating part 10A and the soft decision error correction decoding part 27A here, the differential decoding processing and frame synchronizing signal detecting processing for frame position detection do not need to be executed immediately upstream of the soft decision error correction decoding part 27A, and can constitute a function block (circuit) separate from the likelihood generating part 10A without causing any particular trouble in operation.

The MSB symbol likelihood generating part 15A for generating the MSB-side likelihood can be used, as it is, without making special modifications, as means of differential decoding for QPSK in which only one signal is disposed in each quadrant as illustrated in FIG. 3.

The LSB coordinate rotating part 24 takes in, for example, a modulation method signal from the outside as input information about the method of modulation, and can switch operation between a differential decoding function for QPSK signals and a differential decoding function for 16-QAM signals by switching between whether the function on the LSB side is used or not. The LSB coordinate rotating part 24 can thus be configured so as to be compatible with a plurality of modulation methods.

As described above, the multilevel differential decoding device for a QAM modulation communication system according to the first embodiment (FIGS. 1 to 4) of the present invention includes the synchronous detection part 11 for receiving a signal in which differential encoding has been performed on the first two most significant bits of an N-bit (N≥4) transmission symbol, the MSB coordinate rotating parts 14a and 14b for performing coordinate rotation based on information of the first two most significant bits out of a reception symbol of the signal received via the synchronous detection part 11, the MSB symbol likelihood generating part 15 for generating likelihood with respect to the first two most significant bits after differential decoding, with the use of two sets of bit strings at different points in time for which coordinate rotation has been performed based on the first two most significant bits, the LSB symbol likelihood generating part 25 for generating, independently of the first two most significant bits, likelihood with respect to less significant bits out of the reception symbol of the received signal that are (N−2) bits on the least significant side, and the soft decision error correction decoding part 27 for generating a decoded signal by performing error correction decoding processing with the use of the likelihood of the first two most significant bits which has been generated by the MSB symbol likelihood generating part 15 and the likelihood of the less significant bits which has been generated by the LSB symbol likelihood generating part 25.

The LSB symbol likelihood generating part 25 switches the operation of the less-significant bit likelihood generating function between "in use" and "not in use", with a modulation method signal for switching modulation methods as input information.

In order to generate two sets of bit strings, the part that handles MSB coordinate rotation includes the MSB coordinate rotating part 14a (a first MSB coordinate rotating part) for performing coordinate rotation on a signal received at the time t, which represents a point in time, and the MSB coordinate rotating part 14b (a second MSB coordinate rotating part) for performing coordinate rotation independently of the first MSB coordinate rotating part on a signal received at the time t−1, which is one symbol prior to the time t.

The multilevel differential decoding method for a QAM modulation communication system according to the first embodiment of the present invention includes a reception step of receiving a signal in which differential encoding has been performed on the first two most significant bits of a transmission symbol, an MSB coordinate rotation step of performing coordinate rotation based on information of the first two most significant bits out of a reception symbol of the received signal, an MSB symbol likelihood generation step of generating likelihood with respect to the first two most significant bits after differential decoding, with the use of two sets of bit strings at different points in time for which coordinate rotation has been performed based on the first two most significant bits, an LSB symbol likelihood generation step of generating likelihood with respect to less significant bits out of the reception symbol of the received signal that are (N−2) bits on the least significant side, and a soft decision error correction decoding step of generating a decoded signal by performing error correction decoding processing with the use of the likelihood of the first two most significant bits and the likelihood of the less significant bits.

In the LSB symbol likelihood generation step, the operation of the less-significant bit likelihood generating function is switched between "in use" and "not in use", with a modulation method signal for switching modulation methods as input information.

Thus, while a related-art devices need to accomplish differential decoding that takes into account sixteen (four levels×four quadrants) combinations at maximum in the case of differential encoding of 16-QAM modulation (four-level modulation), for example, the first embodiment of the present invention only needs to take into account four (four level×one quadrant) combinations because reference in likelihood generating processing is reduced to a single quadrant (the first quadrant) alone by executing differential decoding in combination with coordinate rotation, and can therefore reduce the circuit scale significantly.

In other words, by executing differential decoding after coordinate rotating processing, based on information of the first two most significant bits which indicates quadrant information, a differential decoding circuit can have a simple configuration without needing to increase the degree of multilevel.

The first embodiment also accomplishes likelihood generation compatible with a plurality of modulation methods with substantially the same circuit by executing the generation of MSB-side bit likelihood based on quadrant identification in the MSB symbol likelihood generating part 15 independently of the generation of LSB-side bit likelihood in the LSB symbol likelihood generating part 25.

The multilevel differential decoding device for a QAM modulation communication system according to the first embodiment (FIG. 5) of the present invention further includes the frame synchronizing signal detecting part 28, which is connected to the soft decision error correction decoding part 27A, and in the signal received by the synchronous detection part 11, the first two most significant bits on which differential encoding has been performed are allocated a frame head bit string which indicates the head of an error correction frame.

The MSB symbol likelihood generating part 15A in this case generates a post-differential decoding frame head bit based on the frame head bit string, and inputs the generated frame head bit to the frame synchronizing signal detecting part 28. The frame synchronizing signal detecting part 28 detects the head position of a frame for error correction decoding from the post-differential decoding frame head bit, and inputs the frame head position to the soft decision error correction decoding part 27A.

Alternatively, the frame synchronizing signal detecting part 28 is configured independently of the likelihood generating part 10A to generate a post-differential decoding frame head bit based on the frame head bit string, detect the head position of a frame for error correction decoding from the post-differential decoding frame head bit, and input the frame head position to the soft decision error correction decoding part 27A.

The multilevel differential decoding method for a QAM modulation communication system according to the first embodiment of the present invention further includes a frame synchronizing signal detection step, which is executed before the soft decision error correction decoding step. In the signal received in the reception step, the first two most significant bits, on which differential encoding has been performed, are allocated a frame head bit string which indicates the head of an error correction frame. The frame synchronizing signal detection step involves generating a post-differential decoding frame head bit based on the frame head bit string, and detecting the head position of a frame for error correction decoding from the post-differential decoding frame head bit. In the soft decision error correction decoding step, the frame head position is used to generate a decoded signal.

Error correction decoding that is even higher in tolerance to phase slipping is thus accomplished by executing the detection of the frame synchronization position after the differential decoding of the MSB-side bits.

The invention claimed is:

1. A multilevel differential decoding device for a QAM modulation communication system which uses QAM modulation, comprising:
    a synchronous detection part for receiving a signal in which differential encoding has been performed on first two most significant bits of an N-bit transmission symbol, where N≥4 holds;
    an MSB coordinate rotating part for performing coordinate rotation based on information of the first two most significant bits out of a reception symbol of the signal received via the synchronous detection part;
    an MSB symbol likelihood generating part for generating likelihood with respect to the first two most significant bits after differential decoding, with use of two sets of bit strings at different points in time for which coordinate rotation has been performed based on the first two most significant bits;
    an LSB symbol likelihood generating part for generating likelihood with respect to less significant bits out of the reception symbol of the received signal that are (N−2) bits on a least significant side; and
    a soft decision error correction decoding part for generating a decoded signal by performing error correction decoding processing with use of the likelihood of the first two most significant bits which has been generated by the MSB symbol likelihood generating part and the likelihood of the less significant bits which has been generated by the LSB symbol likelihood generating part.

2. A multilevel differential decoding device for a QAM modulation communication system according to claim 1, wherein the LSB symbol likelihood generating part switches operation of a less-significant bit likelihood generating function between "in use" and "not in use", with a modulation method signal for switching modulation methods as input information.

3. A multilevel differential decoding device for a QAM modulation communication system according to claim 1, wherein, in order to generate the two sets of bit strings, the MSB coordinate rotating part comprises:
    a first MSB coordinate rotating part for performing coordinate rotation on a signal received at a certain point in time; and
    a second MSB coordinate rotating part for performing coordinate rotation on a signal received one symbol prior to the certain point in time.

4. A multilevel differential decoding device for a QAM modulation communication system according to claim 1, further comprising a frame synchronizing signal detecting part which is connected to the soft decision error correction decoding part,
    wherein, in the signal received by the synchronous detection part, the first two most significant bits on which differential encoding has been performed are allocated a frame head bit string, which indicates a head of an error correction frame,
    wherein the MSB symbol likelihood generating part generates a post-differential decoding frame head bit based on the frame head bit string, and inputs the generated frame head bit to the frame synchronizing signal detecting part, and
    wherein the frame synchronizing signal detecting part detects a head position of a frame for error correction decoding from the post-differential decoding frame head bit, and inputs the frame head position to the soft decision error correction decoding part.

5. A multilevel differential decoding device for a QAM modulation communication system according to claim 1, further comprising a frame synchronizing signal detecting part which is connected to the soft decision error correction decoding part,
    wherein, in the signal received by the synchronous detection part, the first two most significant bits on which differential encoding has been performed are allocated a frame head bit string, which indicates a head of an error correction frame, and
    wherein the frame synchronizing signal detecting part generates a post-differential decoding frame head bit based on the frame head bit string, detects a head position of a frame for error correction decoding from the post-differential decoding frame head bit, and inputs the frame head position to the soft decision error correction decoding part.

6. A multilevel differential decoding method, performed by a device, for a QAM modulation communication system which uses QAM modulation, comprising:
    a reception step of receiving a signal in which differential encoding has been performed on first two most significant bits of an N-bit transmission symbol, where N≥4 holds;
    an MSB coordinate rotating step of performing coordinate rotation based on information of the first two most significant bits out of a reception symbol of the received signal;
    an MSB symbol likelihood generating step of generating likelihood with respect to the first two most significant bits after differential decoding, with use of two sets of bit strings at different points in time for which coordinate rotation has been performed based on the first two most significant bits;
    an LSB symbol likelihood generating step of generating likelihood with respect to less significant bits out of the reception symbol of the received signal that are (N−2) bits on a least significant side; and
    a soft decision error correction decoding step of generating a decoded signal by performing error correction decoding processing with use of the likelihood of the first two most significant bits and the likelihood of the less significant bits.

7. A multilevel differential decoding method for a QAM modulation communication system according to claim 6, wherein the LSB symbol likelihood generating step comprises switching operation of a less-significant bit likelihood generating function between "in use" and "not in use", with a modulation method signal for switching modulation methods as input information.

8. A multilevel differential decoding method for a QAM modulation communication system according to claim 6, further comprising a frame synchronizing signal detection step, which is executed before the soft decision error correction decoding step, wherein, in the signal received in the reception step, the first two most significant bits on which differential encoding has been performed are allocated a frame head bit string, which indicates a head of an error correction frame, wherein the frame synchronizing signal detection step comprises generating a post-differential decoding frame head bit based on the frame head bit string, and detecting a head position of a frame for error correction decoding from the post-differential decoding frame head bit, and wherein the soft decision error correction decoding step comprises using the frame head position to generate a decoded signal.

* * * * *